US011301199B2

(12) United States Patent
Chang (10) Patent No.: US 11,301,199 B2
(45) Date of Patent: Apr. 12, 2022

(54) MULTI-VIEWPOINT SWITCHED SHOOTING SYSTEM AND METHOD

(71) Applicant: Jiang Chang, Lincolnshire, IL (US)

(72) Inventor: Jiang Chang, Lincolnshire, IL (US)

(73) Assignees: Jiang Chang, Las Vegas, NV (US); Xingchen Liu, Las Vegas, NV (US); Dahooo USA, Las Vegas, NV (US)

( * ) Notice: Subject to any disclaimer, the term of this patent is extended or adjusted under 35 U.S.C. 154(b) by 0 days.

(21) Appl. No.: 16/950,001

(22) Filed: Nov. 17, 2020

(65) Prior Publication Data

US 2021/0072945 A1 Mar. 11, 2021

Related U.S. Application Data

(62) Division of application No. 16/669,804, filed on Oct. 31, 2019, now Pat. No. 10,990,342, which is a
(Continued)

(51) Int. Cl.
*G06F 3/14* (2006.01)
*H04N 5/33* (2006.01)
(Continued)

(52) U.S. Cl.
CPC ............ *G06F 3/1446* (2013.01); *G06F 3/011* (2013.01); *G06F 3/147* (2013.01); *G06F 3/1423* (2013.01); *G09G 5/02* (2013.01); *H04N 5/33* (2013.01); *H04N 13/133* (2018.05); *H04N 13/275* (2018.05); *H04N 13/282* (2018.05); *H04N 13/324* (2018.05); *H04N 13/327* (2018.05)

(58) Field of Classification Search
CPC ...... G06F 3/1446; G06F 3/147; G06F 3/1423; G06F 3/011; H04N 13/327; H04N 13/324; H04N 13/282; H04N 13/133; H04N 13/275; H04N 5/33; G09G 5/02
See application file for complete search history.

(56) References Cited

U.S. PATENT DOCUMENTS

2016/0124608 A1\* 5/2016 Sumner ............... G06F 3/04815
345/175

FOREIGN PATENT DOCUMENTS

CN 102508543 A 6/2012
CN 102508546 A 6/2012
(Continued)

*Primary Examiner* — Nam D Pham
(74) *Attorney, Agent, or Firm* — Danielle C. Sullivan; Carter Ledyard & Milburn, LLP (57) ABSTRACT

A method and system for a displaying content that makes LED real-time 3D displays possible. The 3D image formation includes multi-screen display color correction and multi-camera infrared positioning technology. The present invention presents the display effects of a simulation environment in a better way through switching and moving and ensures that while in movement, the display effects of LED screens taken by video cameras from different angles can be maintained the same, so as to create a vivid simulation environment for television programming and film shooting. The multi-viewpoint switched shooting system and method based on the infrared positioning system includes a multi-faceted irregular screen, a video splicer, a 3D rendering server, an infrared positioning system, a motion-capture computer, a Network switch and a multichannel control server.

9 Claims, 8 Drawing Sheets

Framework Chart of LED 3D Image Formation

Related U.S. Application Data division of application No. 15/719,772, filed on Sep. 29, 2017, now Pat. No. 10,496,353.

(51) Int. Cl.
*G06F 3/01* (2006.01)
*H04N 13/133* (2018.01)
*H04N 13/275* (2018.01)
*H04N 13/282* (2018.01)
*H04N 13/327* (2018.01)
*G09G 5/02* (2006.01)
*H04N 13/324* (2018.01)
*G06F 3/147* (2006.01)

(56) References Cited

FOREIGN PATENT DOCUMENTS

| | | | |
|---|---|---|---|
| CN | 103365572 | A | 10/2013 |
| CN | 103744518 | A | 4/2014 |
| CN | 103941851 | A | 7/2014 |
| CN | 105159522 | A | 12/2015 |

\* cited by examiner

FIG. 7  Framework Chart of LED 3D Image Formation

FIG. 8 Area Chart of Invention

FIG. 9

FIG. 10  Space Sketch Map

FIG. 11a Position Sketch Map

FIG. 11b Matching Sketch Map

MULTI-VIEWPOINT SWITCHED SHOOTING SYSTEM AND METHOD

PRIORITY AND RELATED APPLICATIONS

This application is a Divisional of U.S. patent application Ser. No. 16/669,804 filed Oct. 31, 2019 entitled "MULTI-VIEWPOINT SWITCHED SHOOTING SYSTEM AND METHOD," which is a Divisional of U.S. patent application Ser. No. 15/719,772 filed Sep. 29, 2017 entitled "THREE-DIMENSIONAL IMAGE FORMATION AND COLOR CORRECTION SYSTEM AND METHOD," which are hereby incorporated by reference in their entirety.

FIELD OF TECHNOLOGY

This invention relates to a 3D image-formation system, more specifically a system and method used for LED display including multi-screen display color correction and multi camera infrared positioning technology.

BACKGROUND

LED large-size screens are extensively utilized in programing, display and advertising. But when utilized, multiple LED screens can have different in viewing angles, positions and directions, and style and dot spacing. When using a video camera to shoot, there will be chromatic aberration, leading to the failed integration of the viewing display effect with the display effect after shooting, as they have evident differences in boundary lines and brightness and darkness. Not all the screens can have the same shooting effects. And the color adjustment of the current LED screens in the market uses a pre-set fixed value, which cannot be matched or adjusted dynamically while in the shooting process.

An LED display is realized by the permutation and combination of minor LED lights of the three basic colors (red, green and blue). So in different viewing angles, there will be different chromatic aberration displays, having great influence on viewing and shooting screen effects. When shooting LED screens, normal colors and color temperature can be shown only when the video camera is facing the screen directly. But when multiple screens are joined together, it's unable to ensure the video camera is facing all the screens directly or shooting from the one fixed unified angle, so the display effect of LED screens is greatly destroyed.

Currently, video cameras have multiple methods of positioning, including infrared positioning, visual positioning, laser positioning, ultrasonic positioning and so on. But they don't have a position tracking system to conduct color correction on the screen display.

The multi-camera infrared positioning technology is often used in film and television, including skeletal animation, positioning of the video camera and moving track, moving coordinates of relevant marked goods and so on. However, there is no positioning application method of multi-image space matched with the 3D integration of several multifaceted irregular screens.

In a known layout, a little infrared emitter is installed on the head of the several video cameras and one to two infrared sensors are added above the space for shooting.

Figure 3:
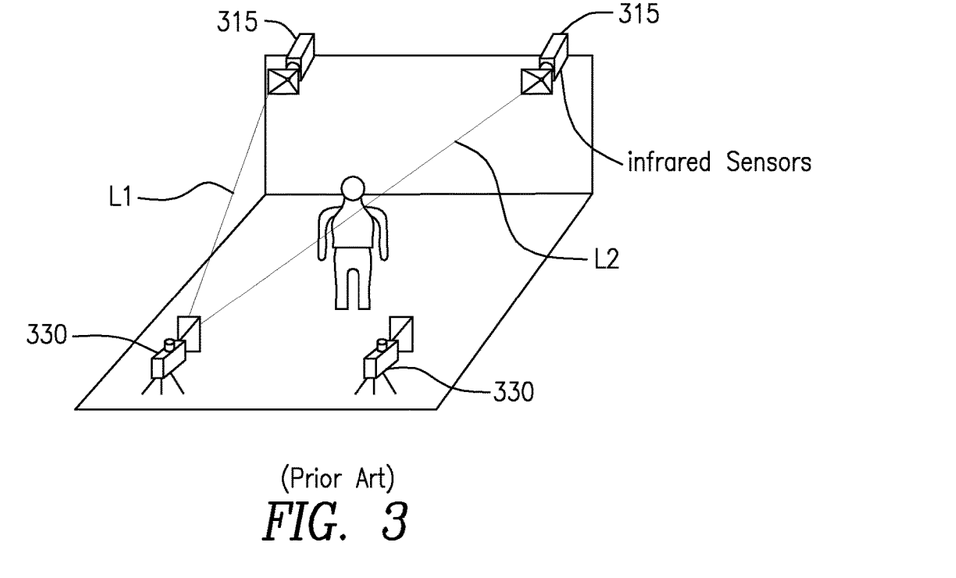
FIG. 3 shows a sketch map of the prior art using multi-camera infrared positioning technology.
Figure 4:
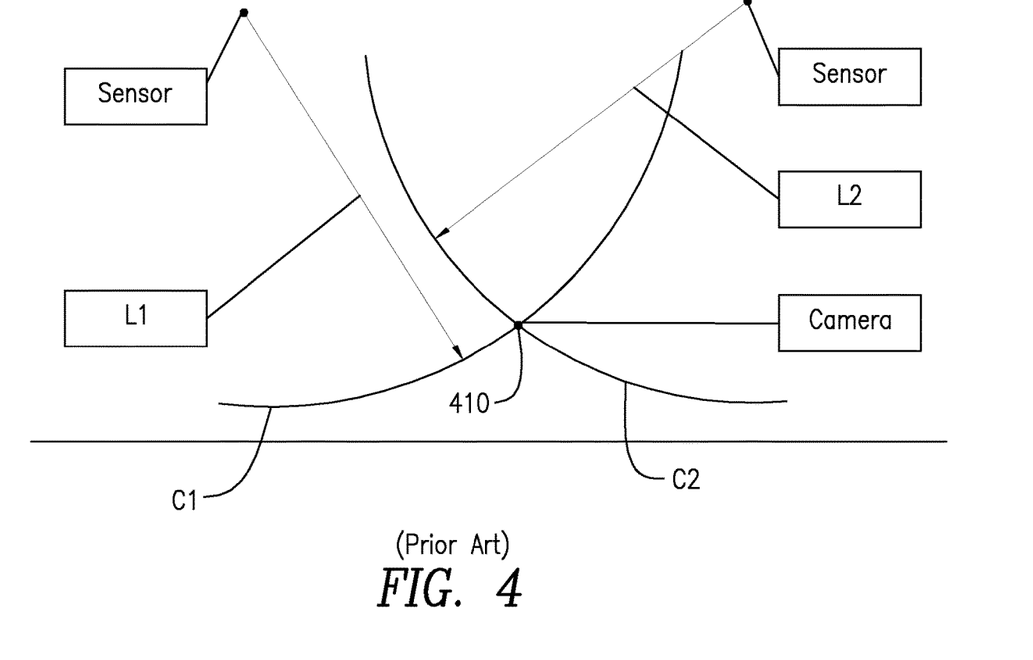
FIG. 4 shows a sketch map for calculating a position of the cradle head with current technologies.

The two infrared sensors 315 in the prior art measure the distance between the video camera 330 and the two infrared sensors namely distance L1 and distance L2 by receiving the infrared signal sent by the infrared emitter on the head of the video camera. Then the position of the cradle head, as shown in FIG. 4 can be calculated. Taking the two infrared sensors 315 as the centers, two circles C1, C2 with radius of distance L1 and distance L2 can be drawn respectively. The intersection point 410 is the position of the video camera. Using the positions of the video camera in the space can be determined respectively. Accordingly, calculations using the position of the video camera are used to later form the image. When switching the video cameras, the images taken by them are matched with their real positions.

Current multi-camera infrared positioning technology gets the needed coordinate information only, by locating the same space position and cannot process the positioning data of multi-virtual space featured as multi-angle and multifaceted and synchronize the coordinate relationship of different virtual spaces. Currently, there are no switchable methods of multiple position coordinates that can be applied to multi-screen display 3D space, and therefore fail to satisfy the applications of the 3D integration space of multifaceted irregular screens.

Some major 3D image-formation technologies in current technologies include a LED display technology and Space Coordinate Matching Technology. In LED screen display technology the current display method is passive and flat. No matter how the LED screens are pieced together, they cannot display an accurate 3D image. Furthermore, the displayed image will not move according to the position of the viewer in real time and cannot stimulate an accurate 3D space environment. Large-size LED screens have been used as display units or mediums. In the LED screen industry, there is no relevant positive screen display technology.

Space coordinate matching technology focuses on virtual reality applications. While there are a few applications introducing coordinates in a virtual world matching real environment there are no applications with multi-things and multi-viewpoints introducing coordinates in a virtual world matching real environment.

Chinese Publication CN103941851A teaches a method and system of realizing virtual touch calibration. The method includes creating a virtual calibration list; building up a $1^{st}$ coordinate system based on the surface located by the virtual calibration list; building up a $2^{nd}$ coordinate system to present the gesture positions of the users; calculating the correspondence between the above-mentioned $1^{st}$ coordinate system and $2^{nd}$ coordinate system; based on the correspondence, using the coordinate of the $1^{st}$ coordinate system to show the gesture positions of the users presented by the $2^{nd}$ coordinate system; using the gesture positions of the users shown by the coordinate of the $1^{st}$ coordinate system to calibrate the correspondence between the users' gestures and the virtual calibration list.

In known technologies, 3D virtual projection and touching user interfaces in virtual environments and its implementation methods can include one or more of the depth detecting device, the parallax of a binocular calculating module, the binocular image processing module, the 3D display device, the gesture recognition module, and the camera and the touch controller in a virtual environment.

Chinese Publication CN103941851A teaches recalibrating the users gesture when the position of the depth detecting device is changed or the distance of pupils is changed after the change of users. The technology of clicking the calibration point on the virtual calibration list by the users will be adopted to re-calibrate users' gesture operation and virtual projection images, so as to effectively solve the inconformity between click of gesture and response when the above-mentioned change happens in the current technologies to maintain the accuracy of the interaction.

Chinese Publication CN103365572 teaches a long-distance control method of an electronic device. This method is applied between a 1$^{st}$ electronic device and the 2$^{nd}$ electronic device, which are connected to each other by wireless ways. The 1$^{st}$ electronic device includes an image acquisition device and a touch control display unit; the 2$^{nd}$ electronic device contains a display unit. The method includes: the 1$^{st}$ electronic device acquires real-time images of the 1$^{st}$ display contents displayed by the above-mentioned display unit by the above-mentioned images and display the real-time images in the touch display control unit; building up the relationship of coordinate transformation between corresponding display coordinates of the real-time images and the corresponding display coordinate of the 1$^{st}$ display contents; and detecting the touch control operation information received by the touch display unit and making sure whether the touch point coordinate of the touch control operation corresponds with the 1$^{st}$ display contents in the real-time images. If yes, transforming the corresponding touch control point coordinate of touch control operation into a 2$^{nd}$ coordinate in the display unit according to the 1$^{st}$ display coordinate transform relationship and sending the touch control directive in the touch control operation information to the 2$^{nd}$ electronic device, making it realize the operation on the 2$^{nd}$ coordinate position through the touch control directive.

Chinese Publication 103365572 provides the ability to use an electronic device with a zoom camera and touch screen to control another electronic device. When users gain the displayed contents in another electronic device display unit through the camera, it will be displayed on a touch screen. Users can control the desktop of another electronic device within a certain distance by using the touch screen. The control of a non-touch control display screen can be achieved through by way of touching control.

Chinese Publication CN105159522A teaches a virtual reality display device to respond to peripheral devices. Specific methods include the virtual reality display device having two display screens. Each of the display screens corresponds with a part of the whole interaction scope.

The method includes: gaining the current position coordinate of a peripheral device; transforming the current position coordinate with a corresponding method of the pre-set conditions and getting the responding position coordinate in the designated area. The designated area refers to the corresponding interaction scope of the designated display screen between the two display screens; and conducting position interaction based on the coordinate of the responding position.

Chinese Publication CN105159522 teaches getting a responding position coordinate in a designated scope by transforming a current position coordinate through an attached peripheral device, so as to make the virtual reality display device able to respond to the operation of the peripheral device and realize the interaction with the responding position coordinate of the peripheral device. The responding position coordinate after being transformed is limited to the designated scope, being able to prevent when the current position coordinate interacts with the virtual reality display device, the responding position coordinate of the 2D input leaps into the 3D film and image, so as to overcome the uncomfortable feeling caused by this when users are experiencing the virtual reality.

Chinese Publication CN102508543 teaches a user interface and a realization method of realizing 3D virtual projection and virtual touch in a display device. It includes the following components: a depth detecting device, used for detecting the information of the distance between user's head and hands and the 3D display device; a Binocular image optical parallax calculation module, the module calculates the binocular image optical parallax between the 3D display virtual projection and the scope of users' head and arm length of the user interface according to the received distance information; binocular image processing module, the module is for making images displayed by the left and right eyes to reach the two-eye parallax image calculated by the binocular image optical parallax calculation module and then sends the images after processing to the 3D display device; a 3D display device for conducting 3D displays of the images for binocular processed by the binocular image processing module and using the user interface to display them within the scope of a user's head and arm lengths in the way of 3D virtual projection; a gesture recognition module which captures user finger moving tracks through the camera and combines the depth detecting device to gain information of the distance between users' hands and the 3D display device and recognized hand gestures; a camera that captures user finger moving tracks; and a virtual touch controller for receiving the information from the gesture recognition module and making a corresponding response. The output end of the depth detecting device is connected with the input end of the parallax of binocular image optical parallax calculation module. The parallax calculation module is connected with the input end of the parallax of binocular image processing module, which is connected with the 3D display device. The input end of the gesture recognition module is connected with the depth detecting device and the camera respectively and the output end of the gesture recognition module is connected with the virtual touch controller.

Chinese Publication CN102508546 teaches utilizing depth detection technology, 3D display technology and gesture recognition technology. It creates a brand-new 3D virtual touch interaction method to overcome the current technology's problems that touching must stick to the screen and gestures need to be done within a certain distance from the interactive device. Users can not only conduct the touch operation on the virtual screens, but also realize 3D virtual projection. This invention can not only provide a 3D user interface with feedback, virtual projection and virtual touch, but also brings a convenient and brand-new interaction experience to users.

Chinese Publication CN103744518 teaches a 3D interaction method and a display device and system. This invention includes: conducting 3D interaction with the objects under operation displayed on the screen of the 3D display device through the 3D interaction operation stick; getting the position information of the viewer and conducting a 3D adjustment display based on the parallax in the implementation process of the above-mentioned 3D interaction, according to the changing position information. This publication allows users to view former blocked images from other angles. In this process of the 3D interaction between the 3D interaction operation stick and the objects under operation, when users' sight is blocked by the 3D interaction sticks, hands or other things, only by changing the view position, namely adjusting the display effect of the screen based on the parallax changes, users are able to view the former blocked images from other angles. It's convenient for users to do the 3D interaction operation of the objects under operation without suspending the operation.

SUMMARY OF THE INVENTION

An object of the present invention is to provide real-time color correction software to set parameters, and output color parameters related to each screen in real time to adjust the display effect, so as to achieve a unified viewing effect from any angle, presenting overally unified pictures no matter if it is for an audience to watch or for program shooting.

The method includes the following steps:

1) Gaining position coordinate information of a video camera and images of the multiple screens collected by the above-mentioned video camera.

2) Taking one of the above-mentioned multiple screens as the standard screen and according to the collected images of the multiple screens conducting color correction on the display contents of the other screens, making the display of images collected by the video camera on the other screens achieve the same display effect with that of the standard screen and storing the screen correction parameters conducted to the other screens.

3) Making a judgment of the time of changing of the position of the above-mentioned video camera. If the time is less than or equal to N, then changing the position of the video camera and returning to Step 1); if not, skipping to Step 4).

4) According to the stored multiple screen color correction parameters, using the matched curves of algorithms to guarantee the gain of screen color correction parameters of the video camera in different positions, so as to make images of the several different screens collected by the video camera in different positions present the same effects.

5) When the video camera is in different positions, conducting color correction on other screens according to the screen color correction parameters gained by above-mentioned position coordinate information and the matched curves.

The above-mentioned coordinate information at least includes: coordinate information and camera angle information of the video camera.

The above-mentioned standard screen is selected by the following methods: taking the screen that faces directly against the position of the video camera.

The above-mentioned N can be the value of 5, and can be adjusted to optimize the overall display.

The above-mentioned same display effect refers to the condition wherein the images of the several screens collected by the video camera in different positions and from different angles all present the same color and color temperature, with no difference in colors.

The present invention provides a multi-screen display color correction system, which includes: a large-size screen server, a video camera, a large-size display screen, and a featured color correction server. The color correction server includes an image input module, a position data module, a comprehensive color correction module and an image output module. The comprehensive color correction module receives the video camera position coordinate information transmitted by the position data module, and gains corresponding screen color correction parameters according to the position information of the video camera. Then according to the parameters conducts color correction on the screen display contents sent by the image input module. The screen display contents are output after correction to the large-size display screen by the image output module.

The large-size display screen includes multiple display screens.

The comprehensive color correction module gains the color correction parameters of the multiple display screens according to the different positions of the video camera.

The video camera includes a video camera tracking sensor to collect the coordinate information and camera angle information of the video camera.

The multiple display screens have the same display effect.

The present invention ensures that while in movement, the display effects of LED screens taken by the video camera from different angles can be maintained the same, so as to create vivid simulation environment for television programming and film shooting.

Another objective of the present invention is to provide a multi-viewpoint switched shooting system and method based on an infrared positioning system, used to conduct multi-angle and switchable shooting of the multifaceted irregular screen 3D integration space by acquiring the position parameters of the infrared markers on the video camera and matching the parameter information to different space coordinate systems respectively. Through the adjustment of algorithms, the present invention makes corresponding and synchronous corrections of different space coordinates and matches the coordinates with the positions of the video camera in a real environment. The coordinates of the several video cameras in the positioning system are marked and the coordinate information of the real and relevant video cameras is recognized while switching the video camera, making the 3D space image displayed by each video camera angle match with the real positions.

The invention provides a multi-viewpoint switched shooting system based on an infrared positioning system, which includes: a multifaceted irregular screen, a video splicer, a 3D rendering server, an infrared positioning system, a motion-capture computer, a network switch and a multichannel control server.

The video splicer is installed in the back of the multifaceted irregular screen. The 3D rendering server, the multichannel control server and the network switch are connected with the multifaceted irregular screen respectively and are used to process the images displayed on the multifaceted irregular screen. The infrared positioning system is installed above the multifaceted irregular screen and is connected with the motion-capture computer to track the video camera shooting.

Based on the above schemes, the infrared positioning system includes several infrared cameras installed above the space for shooting; several video cameras are placed in front of the space for shooting and each is equipped with several infrared markers on the head of the camera.

The infrared positioning system is used to get the position parameters of the infrared markers on the video camera.

The motion-capture computer is used to correct the different values between the infrared markers and the lens of the video camera based on the position parameters of the infrared markers to get the coordinate information of the video camera and transmit it through the network switch to the 3D rendering server and the multichannel control server.

The 3D rendering server outputs the display of 3D space images.

The multichannel control server matches the coordinate information of the video camera to the virtual space for usage and matches the coordinate information of the video camera with the coordinate information of the virtual space.

A multi-viewpoint switched shooting method based on the infrared positioning system, includes the following steps:

Step 1, get the position parameters of the infrared markers on all the video cameras through the infrared positioning system and send the parameters to the motion-capture computer through the Network switch;

Step 2, use the motion-tracking software in the motion-capture computer to correct the difference value between the infrared markers and the lens of the video cameras according to the position parameters of the infrared markers. Then transmit the parameter information to the 3D rendering server and the multichannel control server;

Step 3, project the parameter information of the video camera to the virtual space via the multichannel control server. Through the adjustment of the image projection algorithm, match the parameter information of the video camera with the parameter information of the video camera in the virtual space;

Step 4, the 3D rendering server outputs the display of the 3D space image according to the images taken by the video camera and the parameter information of the video camera in the virtual space;

Step 5, operate the motion-capture computer to switch the video camera. At the same time, the system switches the angle and position of virtual scenes, so as to make the displayed 3D space image match with the images taken by the video camera. The 3D space image presents a complete 3D scene through the display of different screens.

The motion-tracking software used can be MotiveTracker and its plugins, for example.

The present invention uses four independent 3D rendering servers to output the display of 3D space images, the multi-camera infrared positioning system to locate the position of the video camera and the infrared markers to mark the video camera. The position parameters of the infrared markers of each video camera are recognized through the infrared positioning system and the different values between the infrared markers and the lens of the video camera are corrected respectively. The corrected coordinate information is matched to different space coordinate systems. The different space coordinates are matched through the adjustment of algorithms. The coordinate information of relevant video cameras are recognized while switching the video camera, so as to make the displayed 3D space match with it.

The benefits of the present invention include:

1) This invention ensures that when different video cameras shoot several LED screens with different angles from different angles, the 3D space can maintain a normal display and right display effect after switching the camera position without being stretched or distorted.

2) This invention provides better display effects of simulation environment space through multi-camera switching and moving. The various shooting effects can be used for television program production and film shooting.

3) This invention provides new shooting methods and expands new thinking for program creation for broadcast, television and film production. It supports the presentation of grand scenes, such as oceans, forests, aerospace and abstraction space, in very small space.

The present invention provides a LED 3D image-formation method, including the following steps:

Step 1, setting mesh for several LED displays in the virtual 3D space;

Step 2, Getting the position data of users in a real environment;

Step 3, transforming the above-mentioned position data into the position data in the virtual space;

Step 4, locating a user's position in the virtual 3D space based on the above-mentioned position data;

Step 5, shooting in the virtual 3D space according to the location of the user in the virtual 3D space, using an orthographic camera;

Step 6, displaying the above-mentioned contents of virtual 3D space shot by the orthographic camera on several LED display screens.

The above-mentioned position data of the user in a real environment is the coordinates of the user in the character position coordinate space, the above-mentioned virtual space position data is the coordinates of the user in the virtual space coordinate space.

The above-mentioned several LED display screens include at least: a LED display screen facing the user, a LED display screen in the left side of the user, a LED display screen in the right side of the user, and a LED display screen in the bottom of the user.

The contents in virtual space are adjusted and displayed on the above-mentioned several LED display screens according to the position, area and quantity of the above-mentioned LED display screens.

A model of the virtual 3D space can be made through 3DMAX prior to Step 1) above, to set the mesh for the area and coordinate of the above-mentioned several LED display screens.

The output contents shot by an orthographic camera include images and/or videos.

The present invention provides a LED 3D image-formation system, which includes: a server, a positioning system, a large-size screen splicer and several LED display screens. The server is made up of a tracking module, a large-size screen display module and a virtual scene module.

A coordinate tracker tracks the position of users and the tracking sensor is used to receive the parameters of users' position given by the coordinate tracker and sends the parameters to the server. The server utilizes the tracking module to deal with the parameters and gets the coordinate position data of users in a real environment, transforming them into the virtual space position data in virtual 3D space. The large-size screen display module outputs the virtual space contents according to the virtual space position data, the virtual scene module renders and outputs models of a virtual 3D space. The large-size screen display module receives contents of the virtual space and displays them on several LED display screens.

The positioning system comprises an infrared tracking sensor and an infrared coordinate tracker.

The virtual scene module includes an orthographic camera for shooting virtual 3D space according to above-mentioned virtual space position data. The content of shooting is sent to the large-size screen display module. The orthographic camera utilizes its own principle, instead of the perspective to set LED mesh.

The benefits of the present invention include:

The display method of the LED screens is changed from a passive way into a positive one, which allows images and videos to be displayed in different angles according to the changing positions of persons, so as to make real-time change of the displayed contents on the screen according to persons' coordinates and enable LED screens to realize real-time and 3D display. Compared with VR glasses, such a 3D display method of virtual space means that customers don't need to wear heavy and inflexible headsets and annoying wires and cables but can instead enjoy an easy immersive feeling in the virtual space.

DETAILED DESCRIPTION

Overall unified pictures can be presented by recognizing the shooting position of the video camera and the parameters related to the cameras and combining real-time color correction software to set the parameters. The output color parameters are related to each screen in real time to adjust the display effect, so as to achieve a unified viewing effect from any angle, presenting overally unified pictures whether it be for an audience to watch or for program shooting.

Specifically, a mechanical sensor is adopted with grating coding to recognize the position of the video camera and the camera lens parameters. The related parameters of the video camera are gathered and sent to color correction software. The color correction software sets color configuration parameters of the video camera when in different positions in real-time, and connects and matches the parameters of the video camera with the parameters of the sensor. The color correction software uses related algorithms to deal with parameters in different positions, realizing the dynamic match of display effects from different shooting angles.

This creation offers a multi-screen display color correction method, which includes the following steps:

Step 1, gaining the position coordinate information of the video camera and images of the multiple screens collected by the above-mentioned video camera. The above-mentioned position coordinate information of the video camera includes: the coordinate information and camera angle information of the video camera.

Step 2, taking one of the above-mentioned multiple screens as the standard screen and according to the collected images of the multiple screens conducting color correction on the display contents of the other screens, making the display of the images collected by the video camera on the other screens achieve the same display effect with that of the standard screen and storing the screen correction parameters conducted to the other screens. For example, include three screens: Screen A, Screen B and Screen C. Screen A is the standard screen. The chromatic aberration values of Screen B and Screen C are adjusted in color correction software, so as to ensure they have the same display effect with Screen A.

When a camera shoots the display space, due to the structure of LED screens, typically the chromatic aberration between two screens occurs. So software is used to adjust the RGB value of the image of each screen. This RGB value is color correction parameters (noted as r1, g1, b1 below and r2, g2 and b2 below). This RGB value varies depending on the relative position of the camera and each screen. To start, the different shooting coordinates of up to five cameras are collected (to ensure the collection of up to five angles) and get the color correction parameters of the same point in the display space respectively. Using this data, a fitting function related to the camera position and color correction parameters (RGB values) is generated. Later in filming, this fitting function can be used to adjust the RGB value automatically according to the camera position, so as to realize the objective of correcting the display color on multiple screens.

The color correction/matching algorithms used is as follows: the camera position (x, y, z), the RGB value of Screen B (r1, g1, b1), the RGB value of Screen C (r2, g2, b2) wherein the camera position (x, y, z) is an independent variable, and r1, g1, b1, r2, g2, b2 are its dependent variables respectively. That means:

$$r1 = f1(x,y,z)$$

$$g1 = f2(x,y,z)$$

$$b1 = f3(x,y,z)$$

$$r2 = f4(x,y,z)$$

$$g2 = f5(x,y,z)$$

$$b2 = f6(x,y,z)$$

And the f (x, y, z) is used by the data acquired through "least square method". Step 3, determining the position change times of the position of the above-mentioned video camera. If the time is less than or equal to N, then change the position of the video camera and return to Step 1); if not, skip to Step 4).

Step 4, according to the stored multiple screen color correction parameters, use the matched curve of algorithm to guarantee the gain of screen color correction parameters of the video camera in different positions, so as to make images of the several different screens collected by the video camera in different positions present the same effects.

After measuring no less than five points in the same manner, click calculation in the software to gain chromatic aberration values from different angles through the matched curves of the algorithm, so as to guarantee the consistency in the display effects of different screens in the movement of the video camera.

Step 5, when the video camera is in different positions, conduct color correction on other screens according to the screen color correction parameters gained by above-mentioned position coordinate information and the matched curves.

After launching the color correction procedure, the software will read different position coordinates of the video camera and utilize different chromatic aberration correction parameters for each screen to conduct real-time chromatic aberration correction of the large-size screen.

Figure 1:
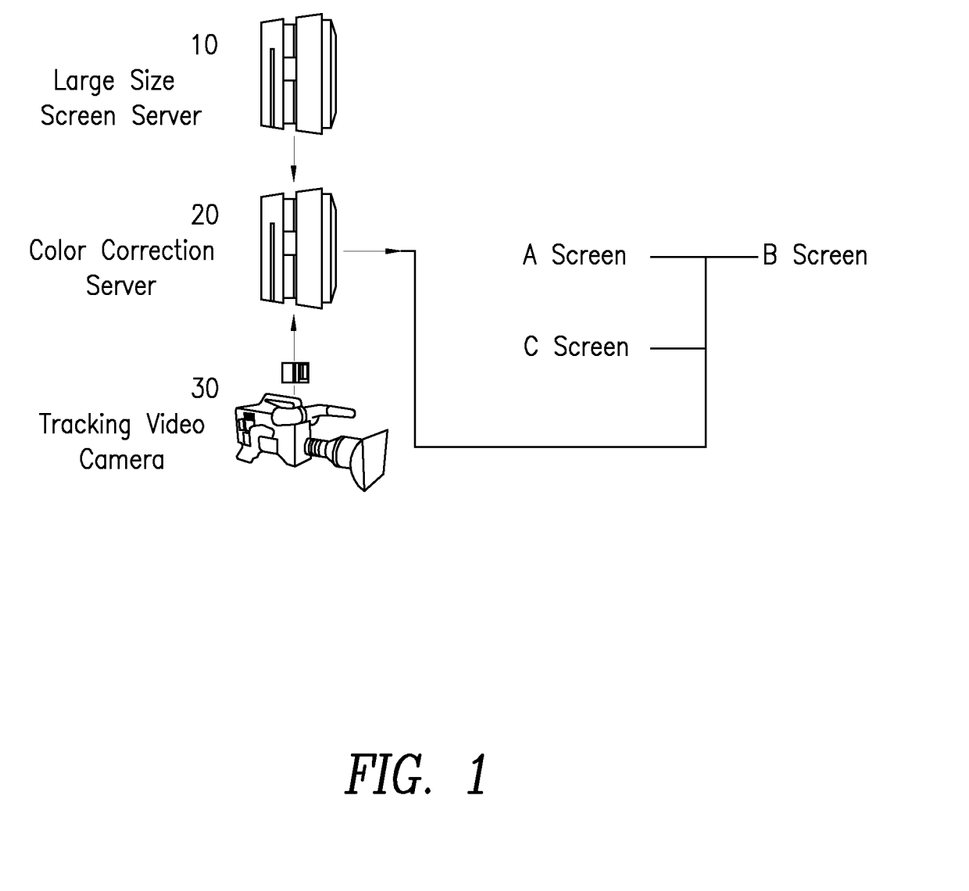
FIG. 1 is the composition of the color correction system of the present invention.

As shown in FIG. 1, the present invention provides a multi-screen display color correction system, which includes: large-size screen server 10, color correction server 20 and tracking video camera 30 with position tracking function and three display screens: Screen A, Screen B and Screen C. Video camera 30 collects images of the three display screens A, B, C. Color correction server 20 receives the contents sent by large-size screen server 10. The contents of large-size screen 10 are also the contents displayed on the three display screens A, B, C. Color correction server 20 conducts color correction of the three display screens A, B, C according to the contents of the three display screens A, B, C taken by video camera 30 and contents sent by large-size screen server 10.

Specifically speaking, take one of the display screens as the standard. For example, taking Screen A as the standard screen, conduct the color correction of Screen B and Screen C, with an effort to avoid chromatic aberration in collected images of the three display screens, Screen A, Screen B and Screen C, have differences in the positions and angles of the camera lens of video camera 30, leading to different color temperatures. After correcting the display parameters of Screen B and Screen C, the display contents of Screen A, Screen B and Screen C collected by video camera 30 present the same effects, namely no appearance of chromatic aberration, so as to create a vivid simulation environment for television programming and film shooting.

Figure 2:
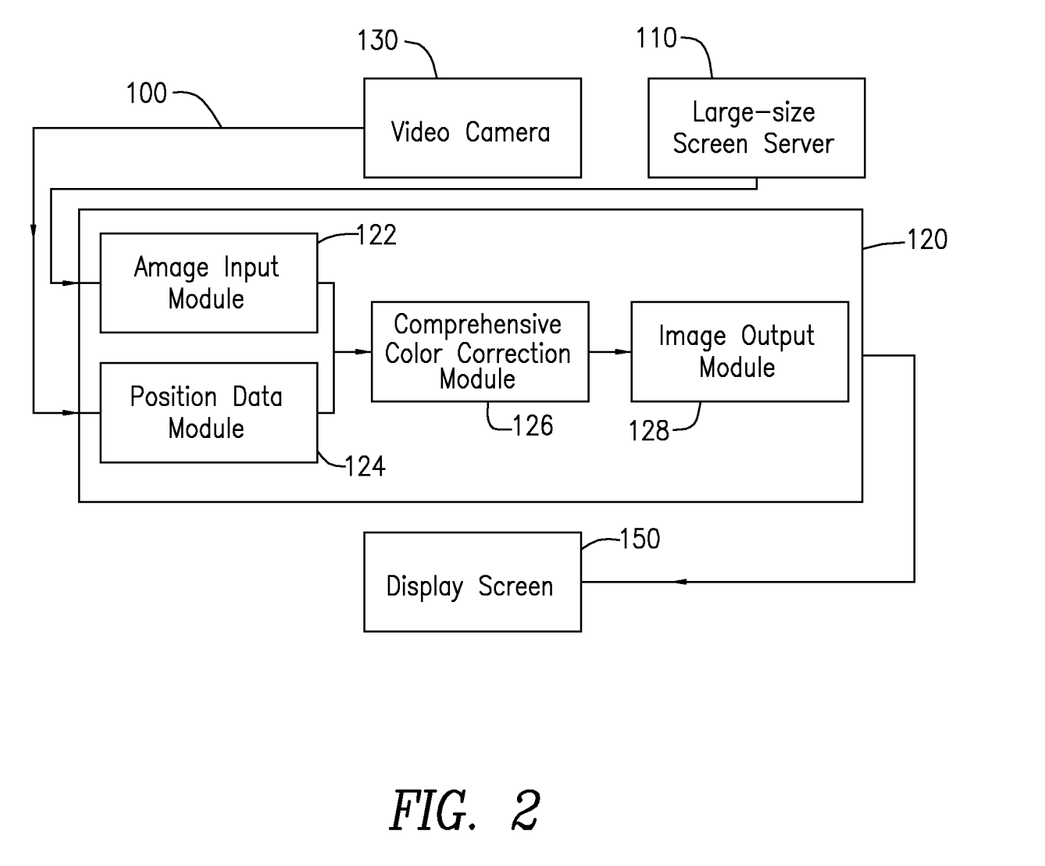
FIG. 2 is shows the framework of an embodiment of the color correction system.

FIG. 2 shows the composition framework of the multi-screen display color correction system 100, including color correction server 120 in detail.

Multi-screen display color correction system 100, includes large-size screen server 110, video camera 130, large-size display screen 150, color correction server 120 and the multi-screen splicer.

Color correction server 120 includes: image input module 122, position data module 124, comprehensive color correction module 126 and image output module 128. Image input module 122 is connected with large-size screen server 110. Position data module 124 is connected with video camera 130. Position data module 124 and image input module 122 are connected with comprehensive color correction module 126 respectively. Comprehensive color correction module 126 is connected with image output module 128. And image output module 128 is connected to large-size display screen 150.

Image input module 122 receives screen display contents output from large-size screen server 110. Position data module 124 receives the position coordinate information output from video camera 130. Comprehensive color correction module 126 receives the video camera position coordinate information transmitted by position data module 124, and according to the position information of video camera 130 gains corresponding screen color correction parameters. Based on the parameters, color correction is conducted on the screen display contents sent by image input module 122. The screen display contents are output after correcting the large-size display screen 150 by the image output module.

Comprehensive color correction module 126 can include a storage module, used to store at least five color correction parameters used for color correction and the matched curves of the color correction parameters, so as to be able to gather the screen color correction parameters of the corresponding multiple display screens based on different position information of the video camera.

Large-size display screen 150 contains multiple display screens, such as Screen A, Screen B and Screen C, making the display effects of the multiple display screens the same. Large-size display screen contains three LED display screens: Screen A, Screen B and Screen C. The LED display screens are placed in the left side, right side and the bottom of video camera 130. Video camera 130 contains a video camera tracking sensor. The video camera tracking sensor adopts the mechanical sensor and grating coding to recognize the position and camera lens parameters of video camera 130.

Comprehensive color correction module 126 is able to take advantage of the different position information of video camera 130 to gain the screen color correction parameters of the multiple display screens. Comprehensive color correction module 126 corrects the screen display contents of one of the multiple display screens or the multiple display screens (such as the display screen B, or the display screen C or the display screen B and C), so as to make the multiple display screens A, B and C have the same display effect.

Before correcting the screen display contents, the display images of the above-mentioned multiple display screens are collected by video camera 130 and one of the display screens is taken as the standard to conduct the color correction of other display screens, thus gaining at least five screen color correction parameters, the matched curves of the screen color correction parameters, and the screen color correction parameters of the video camera in different positions.

Video camera 130 contains a video camera tracking sensor, which is used to collect the coordinate information and camera lens angle information of the video camera. The tracking sensing part of the video camera can utilize a mechanic toothed grating coding sensor such as the one offered by Shenzhen Oscar Company.

The large-size screen server adopted by the system may be provided by Hewlett-Packard Development Company, for example. The video camera utilized may be the video camera with the high definition of Sony. The tracking sensing part of the video camera can be the mechanic toothed grating coding sensor offered by Shenzhen Oscar Company, for example. The LED large-size screen may be produced by Leyard, for example. The large-size screen splicer may also be produced by Leyard, for example. An example of the implementation of the present invention is discussed below. Three LED screens with different angles (left side, right side and the ground) are placed; the video camera is placed in a three-meter rocker equipped with a data collection sensor, keeping a 2-meter distance with the large-size screen; the large-size screen server and the color correction server are started; the video camera is opened to check the shooting pictures; position collection equipment is used to begin collection of the position of the video camera; the pictures and the display colors of Screen A, B and C in the video camera are viewed from different angles; Screen A is used as the standard and the chromatic aberration values of Screens B and C are adjusted in color correction software to ensure they have the same display effects with Screen A; click "record" in the setting of the software and gain the chromatic aberration parameters of Screen B and C in current positions; after moving to another position, take Screen A as the standard and adjust the chromatic aberration values of Screen B and C to ensure they have the same display effects with Screen A; in the same manner, after at least 5 positions, click the "calculate" in the software to collect chromatic aberration values from different angles by the matched curves of the algorithm to guarantee the consistency in the display effects of different screens in the moving video camera; after starting the color correction procedure, the software will recognize the different position coordinates of the video camera to use different chromatic aberration to correct parameters and conduct real-time correction of the chromatic aberration of the large-size screen.

By recognizing the shooting position of the video camera and parameters related to cameras, combining real-time color correction software to set parameters, output color parameters related to each screen are used in real time to adjust the display effect, so as to achieve a unified viewing effect from any angle, presenting overally unified pictures whether for audiences to watch or for program shooting.

Figure 5:
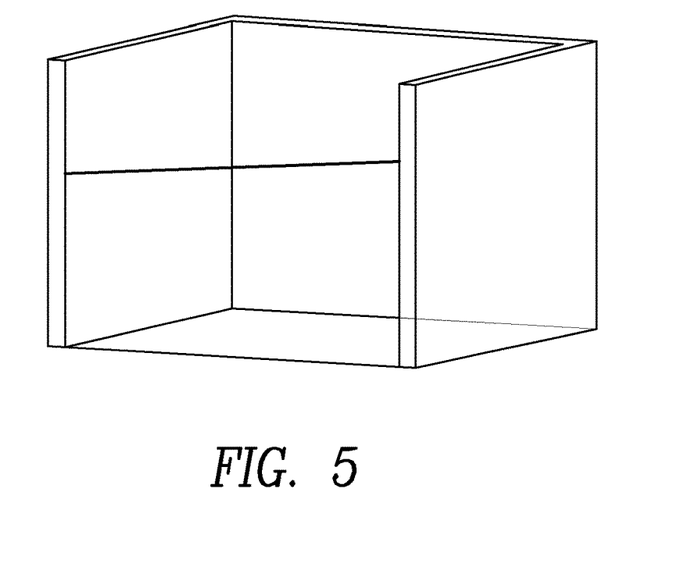
FIG. 5 shows a sketch map of the four-sided display space in an embodiment of the present invention implementation cases.
Figure 6:
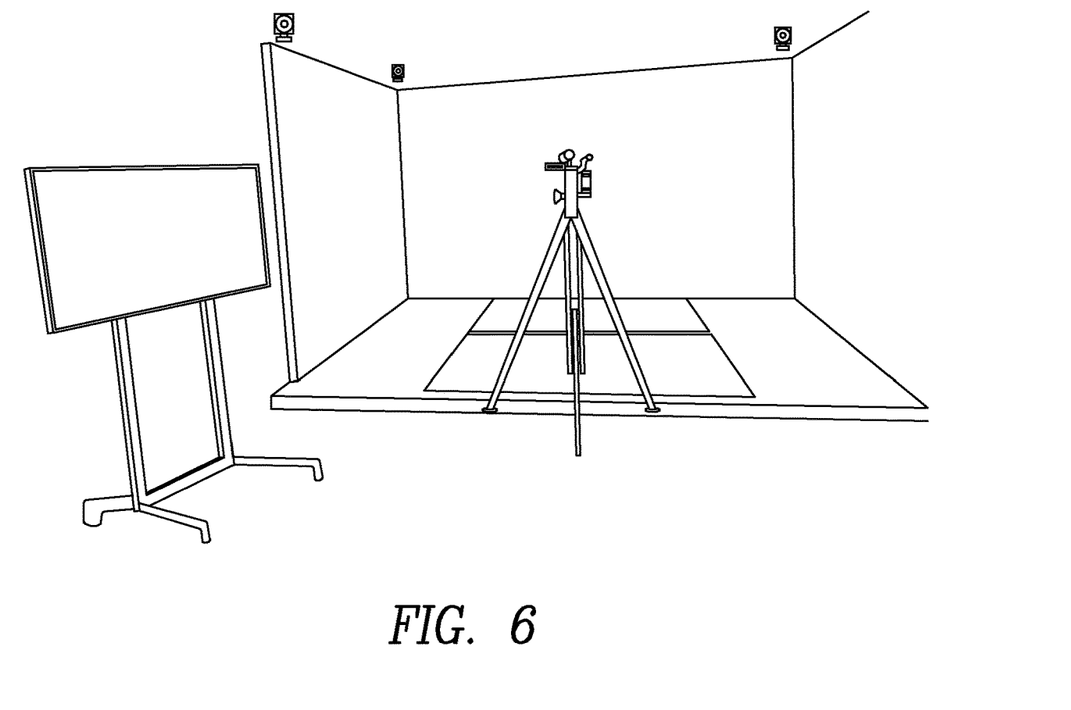
FIG. 6 shows a photo of the multi-viewpoint switched shooting system based on the infrared positioning system in an embodiment of the present invention.

FIGS. 5 and 6 show a multi-viewpoint switched shooting system based on the infrared positioning system of the present invention. The multi-viewpoint switched shooting system includes: a multifaceted irregular screen, a video splicer, a 3D rendering server, an infrared positioning system, a motion-capture computer, a network switch and a multichannel control server.

The video splicer is installed in the back of the multifaceted irregular screen. The 3D rendering server, the multichannel control server and the network switch are connected with the multifaceted irregular screen respectively and are used to process the images displayed on the multifaceted irregular screen. The infrared positioning system is installed above the multifaceted irregular screen and is connected with a motion-capture computer to track what the video camera is shooting.

The infrared positioning system includes several infrared cameras that are installed above the space for shooting. Several of the video cameras are placed in the front of the space for shooting and each is equipped with several infrared markers on the head. The infrared positioning system is used to get the position parameters of the infrared markers on the video camera.

The motion-capture computer is used to correct the difference in value between the infrared markers and the lens of the video camera based on the position parameters of the infrared markers to get the coordinate information of the video camera and transmit it through the network switch to the 3D rendering server and the multichannel control server. The 3D rendering server is used to output the display of 3D space images. The multichannel control server is used to match the coordinate information of the video camera to the virtual space for usage and match the coordinate information of the video camera with the coordinate information of the virtual space.

The above-mentioned multifaceted irregular screen includes at least four LED display screens, which are the front screen, the left screen, the right screen and the ground screen respectively. The multifaceted irregular screens are assembled into a U-shape or a L-shape.

At least 8 infrared cameras are used.

At least 4 3D rendering servers are used and they are independent from each other.

A multi-viewpoint switched shooting method based on the infrared positioning system, includes the following steps:

Step 1, obtaining the position parameters of the infrared markers on all the video cameras through the infrared positioning system and sending the parameters to the motion-capture computer through the network switch In the infrared positioning system, an infrared camera emits infrared rays while at the same time receives infrared rays reflected by a mark point on the camera of the infrared rays emitted by the infrared camera. In such a way, the location of the mark point can be confirmed. The position of the mark point is close to the camera, and overlaps two coordinate points by software. The relative position of the two points will not change. And the change of the camera position is determined based on the change of the position of the mark point.

Step 2, use the motion-tracking software in the motion-capture computer to correct the difference in value between the infrared markers and the lens of the video cameras according to the position parameters of the infrared markers. Then transmitting the parameter information to the 3D rendering server and the multichannel control server.

Step 3, the multichannel control server projects the parameter information of the video camera to the virtual space. Through the adjustment of the image projection algorithms, the parameter information of the video camera is matched with the parameter information of the video camera in the virtual space.

Step 4, the 3D rendering server outputs the display of the 3D space image according to the images taken by the video camera and the parameter information of the video camera in the virtual space.

Step 5, operate the motion-capture computer to switch the video camera. (The location of different cameras are switched to show complete display space every time). At the same time, the system switches the angle and position of virtual scenes, so as to make the displayed 3D space image match with the images taken by the video camera. Switch refers to switching the image shown on the monitor screen from an image filmed by one camera to an image filmed by another camera. The 3D space image presents a complete 3D scene through the display of different screens.

As shown by FIG. 6, Leyard's LED screen with a pixel pitch of 1.9 is used, for example, to build up a four-sided display space with the front screen of 3×4 meters, left and right screens of 3×4 meters and ground screen of 4×4 meters. The video splicer can be MVC-2-203 from Leyard, for example. To render the images on these LED screens respectively, four 3D rendering servers were needed, such as HP Z440, 2 meters' away from the front screen, 3 testing video cameras were placed in parallel. The video camera may be Sony's PW-280, for example. Optitrack system from NaturalPoint, for example, may be used to locate the video camera. This system contains 8 infrared video cameras, distributed in the corners of the display space.

Through the network switch, a NETGEAR ProSafe, P41 for example, the motion-capture computer collects the position parameters of the infrared markers of 3 video cameras by 8 infrared video cameras. The MotiveTracker and plugins are used, for example, in the computer to correct the difference in value between the infrared markers and the lens of the video cameras in the software respectively in order to get the coordinate information of the video camera and transmit the data to the four 3D rendering servers and multi-channel controlling servers through the network switch. The multi-channel controlling server matches the coordinate information of the video cameras to the virtual space respectively. Through the mapping algorithm, the coordinate information of the video cameras and the coordinate information in the virtual space are matched and mark the several video cameras in the positioning system as Point A, Point B and Point C. The motion-capture computer is operated to switch the video camera. At the same time, the system switches the angle and position of virtual scenes, so as to make the displayed 3D space image match with the images taken by the video camera. The 3D space image presents a complete 3D scene through the display of different screens.

One of the technological key points of this invention is a multi-angle switching shooting and moving method used to shoot multifaceted screen 3D space.

Another aspect of the present invention utilizes a positioning system in a real environment, an infrared positioning system, through GPS positioning, visual positioning, laser positioning, ultrasonic positioning and other methods matching the coordinates and area of real LED screens to obtain real position coordinates to calculate in the virtual 3D space. After calculation, the images or videos of the corresponding coordinates of the virtual 3D space are projected to real coordinates of LED screens for display. The displayed contents can move according to the person's coordinate in real time. Finally, it makes the LED screen realize the real-time and 3D display. The above-mentioned infrared positioning system includes an infrared emitter to send infrared light to the infrared coordinate tracking sensor, which acquires the coordinate and area of the objects that are tracked and then sends the data to the server for processing.

Figure 7:
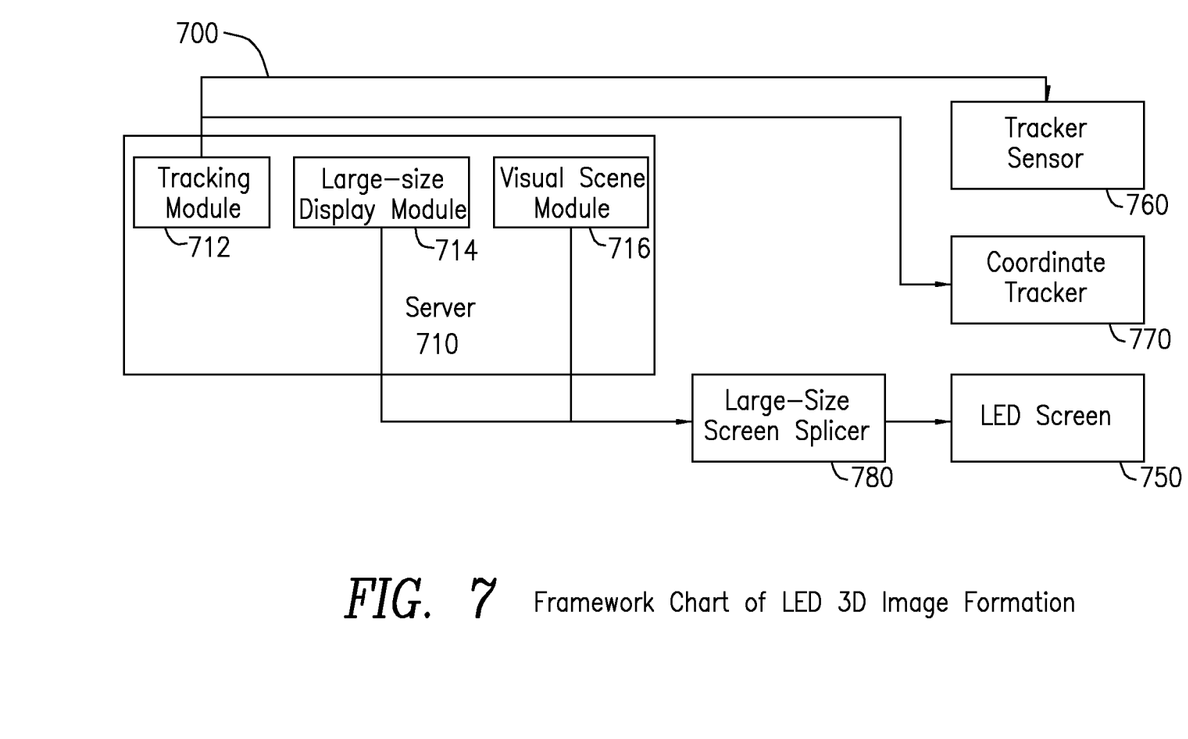
FIG. 7 shows the system framework of the LED 3D image-formation.
Figure 8:
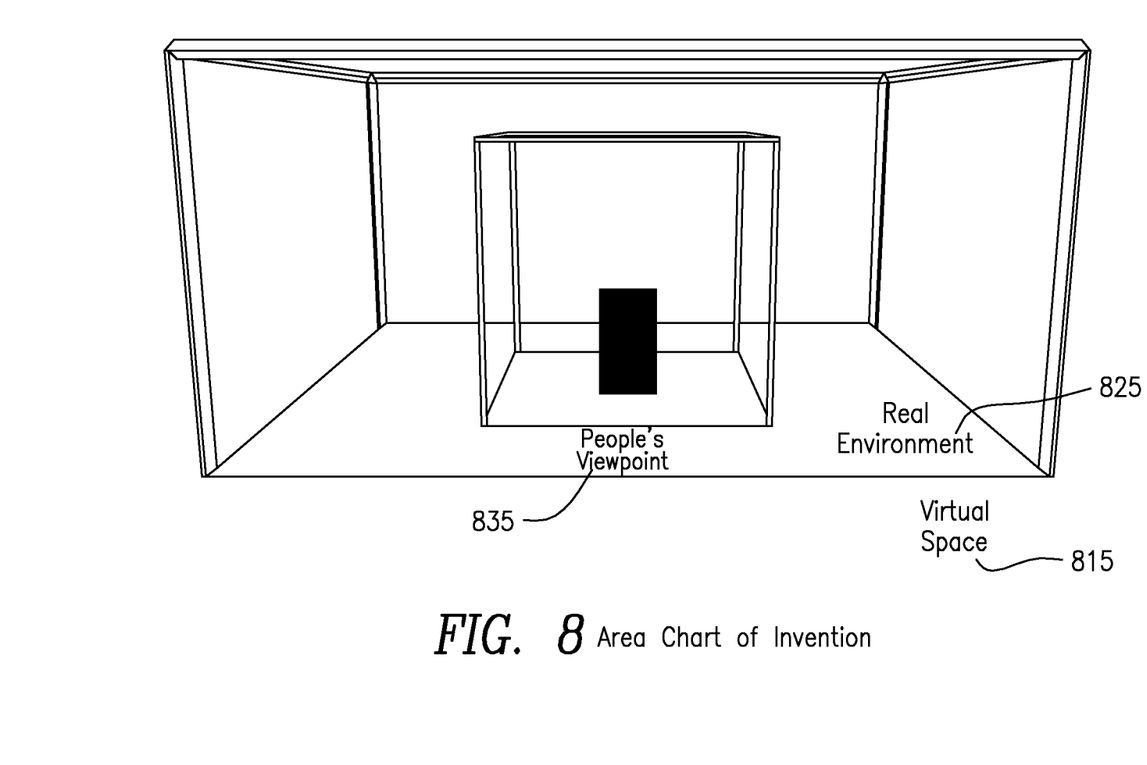
FIG. 8 shows an area chart and virtual space, of an embodiment of the LED 3D image formation of the present invention.
Figure 9:
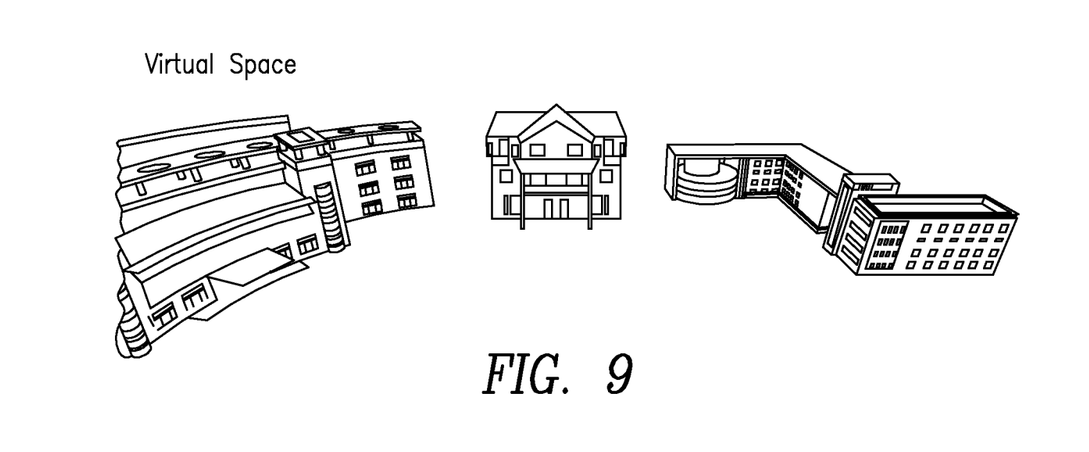
FIG. 9 shows a virtual space sketch map of an embodiment of the present invention.

FIG. 7 shows an embodiment of LED 3D image-formation system 700 of the present invention. The system includes: server 710, tracking sensor 760, coordinate tracker 770, large-screen splicer 780 and LED display screens 750. Server 710 includes three function modules: tracking module 712, large-size display module 714 and virtual scene module 716. Tracking module 712 is used to process the person's coordinate position data in a real environment and locate the virtual space after getting the person's coordinates. Large-size display module 714 is used to display the virtual space contents, including the displayed contents on the front, left and right, and top and bottom LED screens. Large-size screen splicer 780 is used to match the display contents of the several large-size screens 750. Virtual scene module 716 is for rendering and outputting the model of 3D virtual space.

Referring to FIGS. 8-11, the present invention includes three big space coordinates: (1) a Virtual space coordinate 815; (2) a LED screen coordinate in real environment 825 and (3) a person's position coordinate 835. The virtual space coordinate 815 is larger than that of the LED screen coordinate in a real environment 825, namely the whole LED screen space 825 being located in the virtual space coordinate 815 and the person 835 being located in the space of the LED screen 825. Through the positioning system in the real environment (made up by the tracking sensor and the coordinate tracker), the real coordinates of the LED screens and persons are acquired and later projected to match the position coordinates in the virtual 3D space environment, and project the images or videos of the corresponding coordinates of the virtual 3D space to the display of the LED screens, so as to realize the real-time changing of displayed contents on the LED screens with persons' coordinates and realize the real-time and 3D space display of the LED screens.

Figure 10:
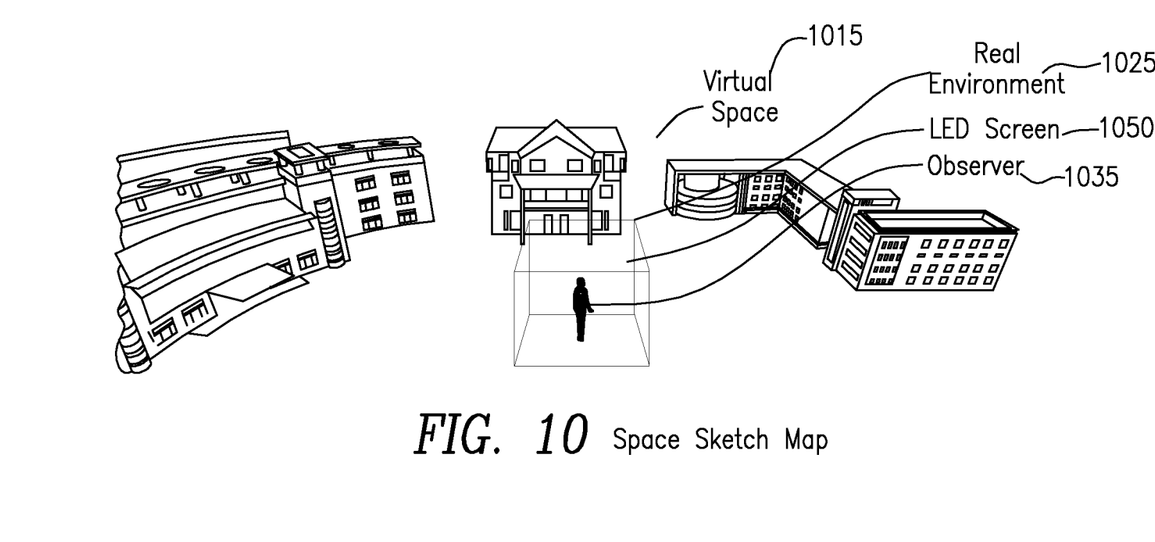
FIG. 10 shows a position sketch map of a 3D image formation embodiment of the present invention's system.
Figure 11A:
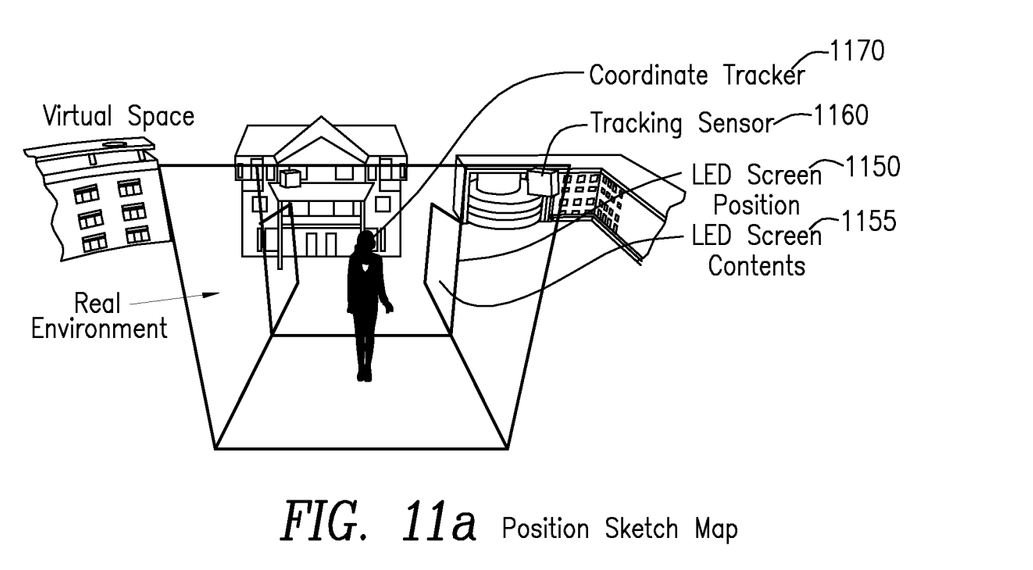
FIGS. 11a-11b show the matching sketch maps of the displayed contents of the changed viewpoints of the present invention.
Figure 11B:
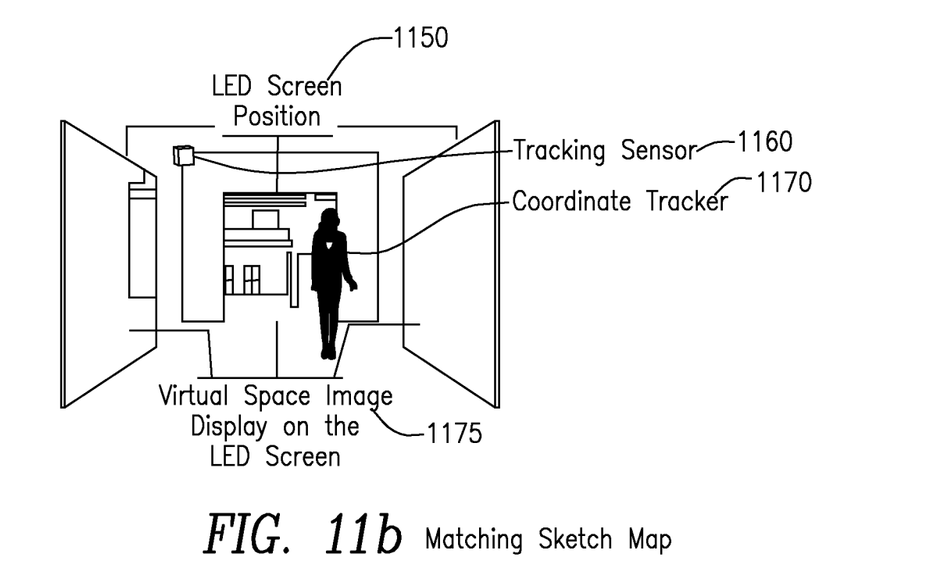

All of the following are used as examples and no limitations are put on the specific implementation methods of this invention. Users are wearing a headset equipped with the infrared coordinate tracker. The headset is selected as an example, other methods can be adopted as well, such as the method of wearing a tracker on the wrist (As seen in FIGS. 10, 11a and 11b). Infrared tracking sensor 1160 is fixed in the real environment and emits infrared light to infrared tracker 1170, which gets the users' position parameters in the real environment and sends the collected coordinates to the server. Infrared tracker 1170 and the infrared tracking sensor 1160 make up the positioning system of the users' positions. The tracking module is used to get the person's coordinate position data in the real environment. And according to this, the person's coordinates are set in virtual space. The users' positions in the virtual space can also be adjusted according to their needs. For example, the default position of the user in the virtual space is the center, the left or the right side. The users' positions in the virtual space is then updated in real time according to the changing positions of the user in the real environment. The large-size display module is used to display the virtual space contents, including the displayed contents on the front, left and right, and top and bottom LED screens. The large-size screen splicer is used to match the display contents of the several large-size screens. The panoramic model of 3D virtual space is rendered and output by the virtual scene module, namely including the 3D virtual scenes presented from all viewpoints. This 3D virtual space model is finished by the user through a 3D designing software, such as 3DMAX, and imported into the server.

The virtual scene module includes setting an orthographic camera to simulate the real view of a user in the real environment. The orthographic camera locates the user's position in 3D virtual space according to the user's position in the real environment to face the LED meshes directly in related directions and gaining the scenes of the 3D virtual space in the viewpoint of the users. At this time, the position of the orthographic camera in the 3D virtual space corresponds with the users' position in the real environment. Then the acquired virtual space scene contents (including images and/or videos) are output to the large-size screen display module, which outputs the virtual space scene contents to the large-size screen splicer, and finally matched and output to the several real LED display screens, so as to realize the update of the virtual space contents with the moving of the positions of actual users.

The server used in the system practice may be the HP Z440, for example. The HTCVIVE-Lighthouse infrared strobe tracking system may be used for tracking. This includes the infrared coordinate tracker and the infrared tracking sensor. The LED large-size screen may be Leyard's screen with P1.9 and a length of 3 meters and a height of 2 meters, for example. The large-size screen splicer may be Leyard's MVC-2-203 and the virtual real-time rendering engine may be UNITY5.40, for example.

The method of the 3D image formation for a LED display includes the following steps.

Step 1, the first step is completing the production of the 3D model needed by the customer in the designing software, such as 3DMAX. This software model is imported into the virtual real time rendering engine, such as UNITY, to conduct the real-time editing for the $2^{nd}$ time and the corresponding plane setting of the area and coordinate of the large-size screen in the real environment. The area and coordinates of the LED display screen are pre-set in the software by the user, namely replacing the real LED display screens by the LED mesh in the 3D model and using the orthographic camera (designed by the software in the 3D model and replaces the view of real users in 3D models) to face directly to the LED meshes in related directions. Output the acquired virtual space image to the large-size screen splicer, which has several corresponding LED large-size screens with different resolution ratios to conduct image adjustment and match to finally send to the real screens for display. The tracking module receives the position parameters of the coordinate tracker and sends them to the server. The server then makes the virtual scenes to move and change based on the corresponding data. The orthographic camera outputs images to the LED large-screens in real environment to stimulate the virtual space.

The above-mentioned server can be set on the LED screen itself, namely the LED display screen can include several display screens, and the server function is equipped in one screen, which serves as the main control screen of the LED display screens. Specifically, this invention provides a 3D image-formation screen, which is used to display virtual 3D images. This LED display screen includes a main control screen and several subordinate screens. The main control screen is made up by the tracking module, the large-size display module, the virtual display module and the large-size screen splicer.

The main control screen is connected with the tracking sensor and the coordinate tracker respectively.

The above-mentioned coordinate tracker tracks users' positions and sends the position parameters to the main control screen.

The main control screen uses the tracking module to deal with users' position parameters, get users' coordinate position data in the real environment and converts it into the virtual space position data in the virtual 3D space. The virtual scene module renders and outputs the model of the virtual 3D space. The large-size screen display module displays the virtual space contents according to the output needs of the virtual space position data. The large-size screen splicer receives the above-mentioned virtual space contents and matches them on the above-mentioned main control screen and the several subordinate display screens.

The above cases are examples of the present invention and are not used to put limitations on the protection coverage of this creation. Any modifications, equal replacement and advancement made within the spirit and principle of this creation shall be under the protection of the invention.

The invention claimed is:

1. A system for a multi-viewpoint switched shooting based on an infrared positioning system, the multi-viewpoint system including a multifaceted irregular screen, a video splicer, a 3D rendering server, an infrared positioning system, a motion-capture computer, a network switch and a multichannel control server;

wherein the multifaceted irregular screen is used to constitute a space for shooting, the video splicer is installed in a back of the multifaceted irregular screen, the 3D rendering server, the multichannel control server and the network switch are connected with the multifaceted irregular screen respectively and used to process images displayed on the multifaceted irregular screen;

wherein the infrared positioning system is installed above the multifaceted irregular screen and is connected with the motion-capture computer to track a video camera while shooting.

2. The system as recited in claim 1 wherein the infrared positioning system includes several infrared cameras installed above a space for shooting with several video cameras, the video cameras being placed in a front of the space for shooting and each video camera being equipped with several infrared markers on a head each of the video cameras.

3. The system as recited in claim 2 wherein the infrared positioning system is used to gather position parameters of the infrared markers on each of the video cameras.

4. The system as recited in claim 3 wherein the motion-capture computer is used to correct a difference in value between the infrared markers and a lens of the video cameras based on the position parameters of the infrared markers to get coordinate information of the video cameras and transmit it through the network switch to the 3D rendering server and the multichannel control server, the 3D rendering server is used to output a display of 3D space images, and the multichannel control server is used to match the coordinate information of the video cameras to a virtual space for use and matches the coordinate information of the video cameras with coordinate information of the virtual space.

5. The system as recited in claim 1 wherein the multifaceted irregular screen includes at least four LED display screens, the at least 4 LED display screens being a front screen, a left screen, a right screen and a ground screen respectively.

6. The system as recited in claim 1 wherein the multifaceted irregular screens are assembled in a U-shape or a L-shape.

7. The system as recited in claim 1 wherein there are at least 8 infrared cameras.

8. The system as recited in claim 1 wherein the number of 3D rendering servers is at least 4 and they are independent from each other.

9. The system as recited in claim 1 wherein the motion-tracking software is MotiveTracker and plugins.

* * * * *